(No Model.)
S. LOUNSBERRY.
ADJUSTABLE ANTIFRICTION BAND SAW GUIDE.
No. 537,576. Patented Apr. 16, 1895.
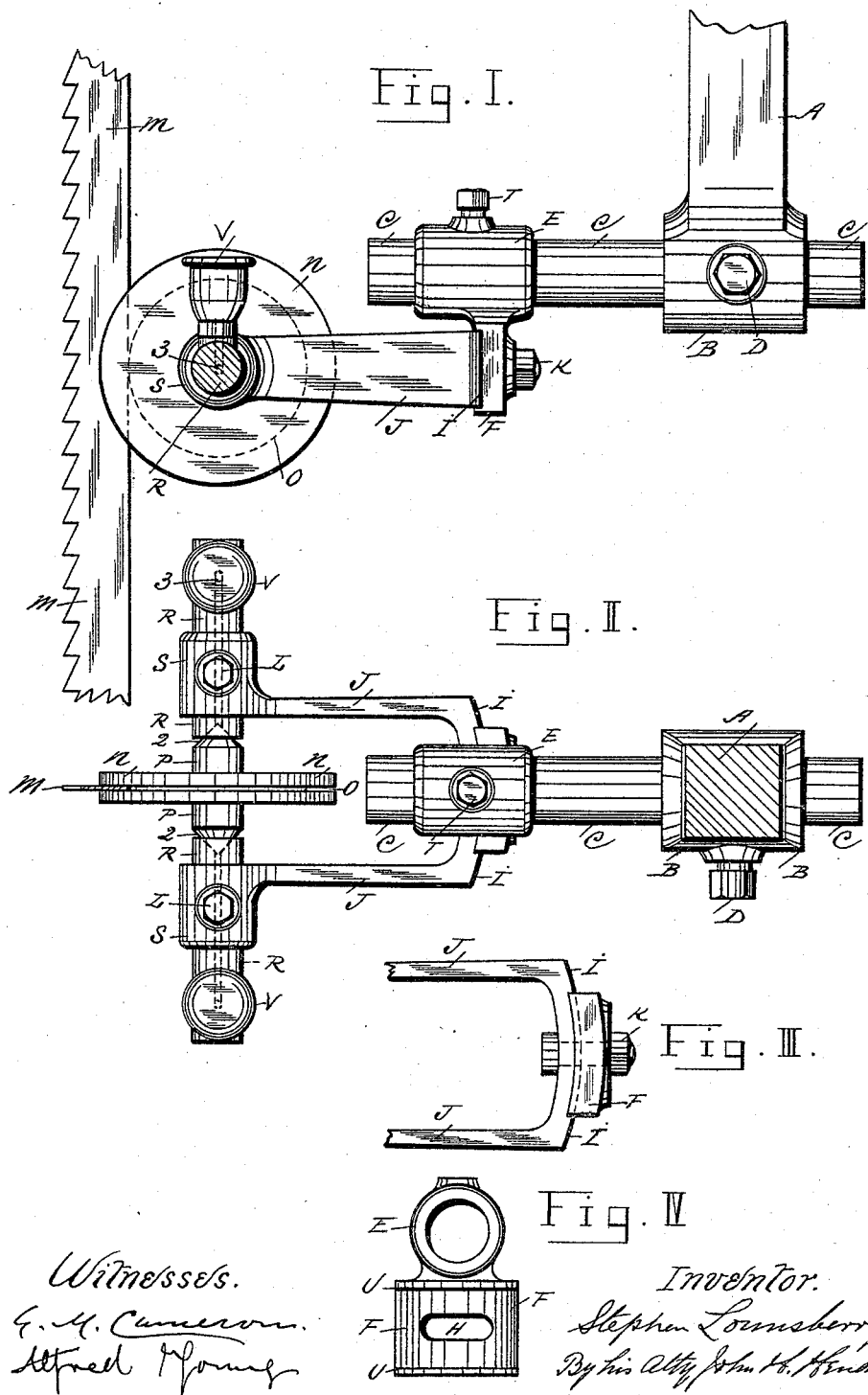

UNITED STATES PATENT OFFICE.

STEPHEN LOUNSBERRY, OF JARVIS, CANADA, ASSIGNOR TO WILLIAM ALLEN HOWELL, OF SAME PLACE.

ADJUSTABLE ANTIFRICTION BAND-SAW GUIDE.

SPECIFICATION forming part of Letters Patent No. 537,576, dated April 16, 1895.

Application filed November 16, 1894. Serial No. 529,067. (No model.)

*To all whom it may concern:*

Be it known that I, STEPHEN LOUNSBERRY, a citizen of Canada, residing at Jarvis, in the county of Haldimand and Province of Ontario, Canada, have invented a new and useful Adjustable Antifriction Band-Saw Guide, of which the following is a specification.

My invention consists of an adjustable antifriction wheel, the periphery of which is grooved out to admit, and engage with the back edge and sides of a band saw which revolves said wheel and is so arranged and devised to revolve in conical center bearings and capable of adjustment, longitudinally, side angled, forward and rearward.

The objects of my improvements are, first, to provide an adjustable and revolving guide for band saws, which shall have permanent, durable and lasting qualities; second, to provide means for the complete and enduring lubrication of the conical bearings of guide wheel, and, third, to afford facilities for the proper adjustment of the elements of the device, independently, of each other in respect to the perpendicularity of the band saw. I attain these objects by the mechanism illustrated in the accompanying drawings, in which—

Figure 1, is a side elevation of my invention, showing at the right hand end, or properly the rear of the device, a vertical square bar connected to rear of band saw machine and which is common to said band saw machine, and generally in position, some five to eight inches, in rear of band saw. This bar is used to support devices, having wooden blocks for guiding the saw. This common vertical bar is capable of vertical adjustment to greater or less distances from the table of the common band saw machines, to suit different thicknesses of wood to be sawed. Fig. 2 is a plan of the same device, these two views embodying very fully my invention. Fig. 3 is a detail plan of the supporting arms, broken, from their two bosses, and the rear convex end which is bolted to the concave of hub shank, said hub broken away from its said shank, to illustrate more fully Fig. 2 of the drawings. Fig. 4 is a detached vertical face view of the said hub, with its concave shank, showing its slotted aperture for bolt to fasten said shank to rear convex end of said arms.

Similar letters and numerals refer to similar parts throughout the several views.

In the drawings the vertical rear bar A, capable of vertical adjustment, and applied on most band saw machines, as before mentioned, supports my invention by means of its lower hub B. A round horizontal bar C, passes through the said hub B, and is capable of being secured to a more forward or rearward position by means of set screw D. This bar C, is provided with a hub E, having concave shank F, with slotted aperture H, in order to allow the convex end I of arms J, to be fastened to said shank by means of bolt K.

The broken vertical saw M, of an ordinary band saw machine, when running, engages with the antifriction wheel N, operating in the annular groove O, thus revolving said wheel with its extended journals P, the outer ends 2, of said journals being conical, and revolve in their bearings R, which conform in shape to the said ends 2. These rigid bearings R, which pass through the hubs S, of said arms J, can, with the wheel N, be adjusted, horizontally, either way, and held in position by means of set screws L, of said bosses. This horizontal adjustment of the wheel, is a very important feature, as it enables the operator to adjust the wheel to an exactness in relation to the saw; and also the adjustment of the wheel with the saw to a forward or rearward position is accomplished by means of sliding the hub E, on its bar C, and fastening said hub by set screw T. The band saw runs perfectly free in the groove of the wheel, and leaves it without any friction on account of the exactness in the adjusting qualities of the device.

In order to adjust the wheel, at a slight angle, either way, from direct line of the sides of saw, when straight as shown, the bolt K, may be loosened, and the arms J, horizontally moved either way, by means of slotted hole H, the convex end of arms conforming to the concave of the shank F, which is provided with upper and lower lips, or flanges U, which act as guides. The convex alluded to, has its radial point at the center of the wheel, and thus, after this movement, and the arms fastened again to altered position, by bolt K, the saw may be run at a slight angle when necessary to slightly adjust the same.

To lubricate the conical ends of wheel journals P, the bearings R, have longitudinal oil channels 3, which run through the same from the oil cups V, to the conical points 2, of journals P, this system of lubrication being a very important element in my invention.

What I claim as my invention, and desire to secure by Letters Patent, is—

1. The guide wheel having annular groove, for band saw, and provided with extended journals P, having conical ends, adapted to revolve in bearings conforming with said ends, the bearings being capable of horizontal adjustment through the bosses S, of arms J, and held in position by set screws L, in combination with the oil cups in position immediately over the outer ends of oil channels 3, convex end of said arms J, fitting into concave of shank F, having guide flanges and slot and held in adjusted position by means of bolt K, substantially as described and set forth.

2. The combination in an adjustable anti friction band saw guide of the guide wheel having annular groove to conform to thickness of band saw, and provided with extended journals having conical point ends, adapted to revolve in adjustable horizontal bearings which conform to said ends, said bearings passing through and supported by the bosses S, and held in adjustable position by set screws L, the extended arms J, of said bosses, their convex end fitting into the concave of shank F, having slot H, flanges I, bolt K, and adjusting hub E, provided with set screw T, and capable of forward and rearward adjustment on the horizontal bar C, which is capable of adjustment in rear vertical bar A, by means of set screw D, substantially as described and set forth.

STEPHEN LOUNSBERRY.

Witnesses:
H. R. HEASLIP,
S. WORDEN.